United States Patent
Taptič et al.

(10) Patent No.: US 10,411,322 B2
(45) Date of Patent: Sep. 10, 2019

(54) BALL JOINT MOUNTS

(71) Applicant: RF Elements s.r.o., Bratislava (SK)

(72) Inventors: Juraj Taptič, Zálesie (SK); Martin Marcinčák, Humenné (SK)

(73) Assignee: RF ELEMENTS S.R.O., Bratislava (SK)

(*) Notice: Subject to any disclaimer, the term of this patent is extended or adjusted under 35 U.S.C. 154(b) by 0 days.

(21) Appl. No.: 15/950,700

(22) Filed: Apr. 11, 2018

(65) Prior Publication Data
US 2018/0233800 A1    Aug. 16, 2018

Related U.S. Application Data

(62) Division of application No. 14/263,495, filed on Apr. 28, 2014, now Pat. No. 9,991,581.

(60) Provisional application No. 61/816,558, filed on Apr. 26, 2013.

(51) Int. Cl.
| | | |
|---|---|---|
| *H01Q 1/08* | (2006.01) | |
| *H01Q 1/12* | (2006.01) | |
| *H04M 1/04* | (2006.01) | |

(52) U.S. Cl.
CPC ............. *H01Q 1/084* (2013.01); *H01Q 1/12* (2013.01); *H01Q 1/125* (2013.01); *H01Q 1/1214* (2013.01); *H01Q 1/1228* (2013.01); *H04M 1/04* (2013.01); *Y10T 29/4995* (2015.01); *Y10T 403/32311* (2015.01)

(58) Field of Classification Search
CPC ........ H01Q 1/084; H01Q 1/12; H01Q 1/1214; H01Q 1/1228; H01Q 1/125; H01Q 1/04; F16C 11/106; F16C 11/069; F16C 11/0695; Y10T 403/32311
See application file for complete search history.

(56) References Cited

U.S. PATENT DOCUMENTS

| | | |
|---|---|---|
| 3,019,041 A | 1/1962 | Scheublein, Jr. et al. |
| 3,241,144 A | 3/1966 | Berger |
| 3,512,162 A | 5/1970 | Siebold et al. |
| 3,798,651 A | 3/1974 | Lehman |
| 3,898,666 A | 8/1975 | Massa |
| 3,987,452 A | 10/1976 | Godet |
| 4,121,893 A | 10/1978 | Morissette |
| 4,157,876 A | 6/1979 | DiGiulio |
| 4,515,336 A | 5/1985 | Fischer |
| 4,755,078 A | 7/1988 | Blumberg |
| 4,755,830 A | 7/1988 | Plunk |
| 4,974,802 A | 12/1990 | Hendren |
| 5,402,139 A | 3/1995 | Maeshima |

(Continued)

FOREIGN PATENT DOCUMENTS

| | | |
|---|---|---|
| FR | 2723154 A1 | 2/1996 |
| WO | 8304078 A1 | 11/1983 |
| WO | 2014/123769 A1 | 8/2014 |

*Primary Examiner* — Jonathan P Masinick
(74) *Attorney, Agent, or Firm* — Ohlandt, Greeley, Ruggiero & Perle, L.L.P.

(57) ABSTRACT

An improved antenna ball joint mount is provided that includes a hollow socket mechanically coupled to a spherical member with a locking part. The hollow socket and the spherical member are fully detachable to simplify the installation of an antenna. A user is able to set a position of the antenna to any point on a spherical sector surface within a range of motion allowed by a shape of joint components and rotate the antenna around own axis to adjust a polarization plane and then lock the mount in a predetermined position.

21 Claims, 14 Drawing Sheets

(56) References Cited

U.S. PATENT DOCUMENTS

| | | |
|---|---|---|
| 5,790,910 A | 8/1998 | Haskin |
| 5,835,068 A | 11/1998 | Paul et al. |
| 5,867,132 A | 2/1999 | Blasing et al. |
| 5,957,445 A | 9/1999 | Hagman |
| 6,045,103 A | 4/2000 | Costa et al. |
| 6,535,177 B1 | 3/2003 | Dhellemmes et al. |
| 6,664,937 B2 | 12/2003 | Vermette et al. |
| 6,911,950 B2 | 6/2005 | Harron |
| 7,040,833 B2 | 5/2006 | Kondoh |
| 7,142,168 B1 | 11/2006 | Sinclair |
| 7,265,732 B2 | 9/2007 | Lin |
| 7,296,771 B2 | 11/2007 | Kallas |
| 7,439,930 B2 | 10/2008 | Bury |
| 7,748,670 B1 | 7/2010 | Veldez |
| 7,954,777 B2 | 6/2011 | Bohm et al. |
| 2002/0084396 A1 | 7/2002 | Weaver |
| 2003/0090820 A1 | 5/2003 | Matsuura et al. |
| 2005/0024276 A1 | 2/2005 | Izumi |
| 2005/0127261 A1 | 6/2005 | Lin |
| 2007/0102603 A1 | 5/2007 | Newell |
| 2007/0283873 A1 | 12/2007 | Jackson |
| 2008/0121767 A1 | 5/2008 | Wimberley |
| 2008/0165076 A1 | 7/2008 | Pan |
| 2010/0066633 A1 | 3/2010 | Singer |
| 2011/0142534 A1 | 6/2011 | Brogardh |

BALL JOINT MOUNTS

CROSS REFERENCE TO RELATED APPLICATIONS

This application is a divisional of U.S. patent application Ser. No. 14/263,495, filed on Apr. 28, 2014, which claims the benefit of U.S. Provisional Application Ser. No. 61/816,558, filed Apr. 26, 2013, the contents of both which are incorporated by reference herein in their entirety.

BACKGROUND OF THE INVENTION

1. Field of the Invention

This invention relates to ball joint mounts that can hold wireless customer-premises equipment or customer-provided equipment (CPE) terminals, antenna or wireless device in place.

2. Description of Related Art

Communication systems such as wireless customer-premises equipment or customer-provided equipment (CPE) terminals, antenna or wireless devices need to be mounted and properly positioned in order to send and receive signals in an efficient manner. Some prior art solutions require the user to know the probable best position azimuth/elevation angles to a station with high precision prior making a fine adjustment due to a limited range of the fine adjustment.

Some prior art solutions require one to use tools and make several steps (e.g. tighten multiple fasteners) in order to lock the antenna or equipment in the proper position. When such antenna or radio equipment is being installed, some prior art solutions require one to do several operations/procedures in order to mount the antenna to the fixed structures and then adjust its position, often requiring assembly in multiple parts and using tools.

Accordingly, it has been determined by the present disclosure that there is a need for ball joint mounts that overcome, alleviate, and/or mitigate one or more of the aforementioned and other deleterious effects of prior art mounts.

SUMMARY

An improved antenna ball joint mount comprising a hollow socket mechanically coupled to a spherical member with a locking part. The hollow socket and the spherical member are fully detachable to simplify the installation of an antenna. A user is able to set a position of the antenna to any point on a spherical sector surface within a range of motion allowed by a shape of joint components and rotate the antenna around own axis to adjust a polarization plane and then lock the mount in a predetermined position.

The improved antenna ball joint mount comprises a hollow socket mechanically coupled to a spherical member with a locking part. A typical ball joint consists of a bearing stud and socket enclosed in a casing, the difficulty with that construction, is that the bearing stud retains freedom to move within the socket, but it cannot readily be held in place, the present invention solves that problem by threading the locking part with male threads and the hollow socket with female threads, enabling the user to screw the locking part onto the hollow socket holding the spherical member in place.

Turning to these components in more detail, the locking part can come in form of a nut typically, but not limited to, with inner thread with a hole in center, to accommodate the spherical member with wide range of allowed movement relative to the hollow socket part. The nut can be equipped with surface easing the grip necessary when the improved antenna ball joint is operated by hand such as ribs or other grating. The hollow socket and spherical member can be made with a coarse finish or other way to increase the friction, so when the locking part is tightened even by hand, it can create a strong friction forces sufficient to fix the position of the spherical member.

The spherical member is mechanically coupled to an antenna which is communicatively coupled to a receiver, transceiver, or wireless device in a manner that is well known in the art. The socket can be mechanically coupled to a surface when the user so desires. This ball joint provides many advantages over the prior art including being able to move the antenna in the horizontal, vertical and spin/rotation directions.

There are three stages of mounting. First the user attaches the antenna into target place by mounting one part of the ball joint onto a structure first. Next, the user attaches antenna by screwing the locking part lightly, allowing the user to find proper direction where signal level is greatest by movement of the antenna with a controlled level of friction. In some embodiments this can be done by observing signal level e.g. using a target device's light emitting diodes (LEDs), utilizing earphones, a voltmeter or observing the signal level using a laptop and then pinpointing the proper direction were signal level is greatest by movement with controlled level of friction in the ball joint where the level of friction adjustable is by screwing the locking part. Third to fix the ball joint again by tightening the locking part so that friction in the ball joint is high enough to keep the antenna in a proper direction, under normal loads such as wind, snow, birds and so on approaching the antenna.

A ball joint mount is provided that includes a ball joint, a mounting member, and a mounted member. The ball joint has a spherical member, a socket member, and a locking member. The spherical member and the locking member form a first portion of the ball joint. The socket member forms a second portion of the ball joint. One of the first and second portions of the ball joint depend from the mounting member and the other of the first and second portions of the ball joint depend from the mounted member. The socket member has a first thread and the locking member has a second thread. The first and second threadably engage one another so as to secure the spherical member between the socket and locking members to prevent relative movement between mounting and mounted members.

In some embodiments, the first thread is an internally facing female thread and the second thread is an externally facing male thread. Here, the locking member can include an outer rim and an internal rim and the socket member includes an outer rim and an inner rim. The outer rim of the locking member can have a larger inner diameter than an outer diameter of at least the outer rim of the socket member. The inner rim of the locking member can include the externally facing male second thread thereon and the outer rim of the socket member can include the internally facing female first thread thereon.

A method of mounting an antenna or wireless device is provided. The method includes the steps of securing the antenna or wireless device and a first portion of a ball joint to one another; securing a mounting device with a second portion of the ball joint to one another; securing the mounting device in a desired location; connecting first and second portions of the ball joint to one another by loosely forming a threaded connection between first and second threads; adjusting a position of the antenna or wireless device to a desired position; and tightening the locking member so as to lock the ball joint in the desired position. Here, one of the first and second portions of the ball joint includes a spherical member and a locking member as a unitary subassembly and the other of the first and second portions of the ball joint includes a socket member. The socket member has a first thread and the locking member has a second thread. The first and second threads threadably engage one another so as to secure the spherical member between the socket and locking members to prevent relative movement between mounting and mounted members.

The above-described and other features and advantages of the present disclosure will be appreciated and understood by those skilled in the art from the following detailed description, drawings, and appended claims.

DETAILED DESCRIPTION OF THE INVENTION

Figure 1:
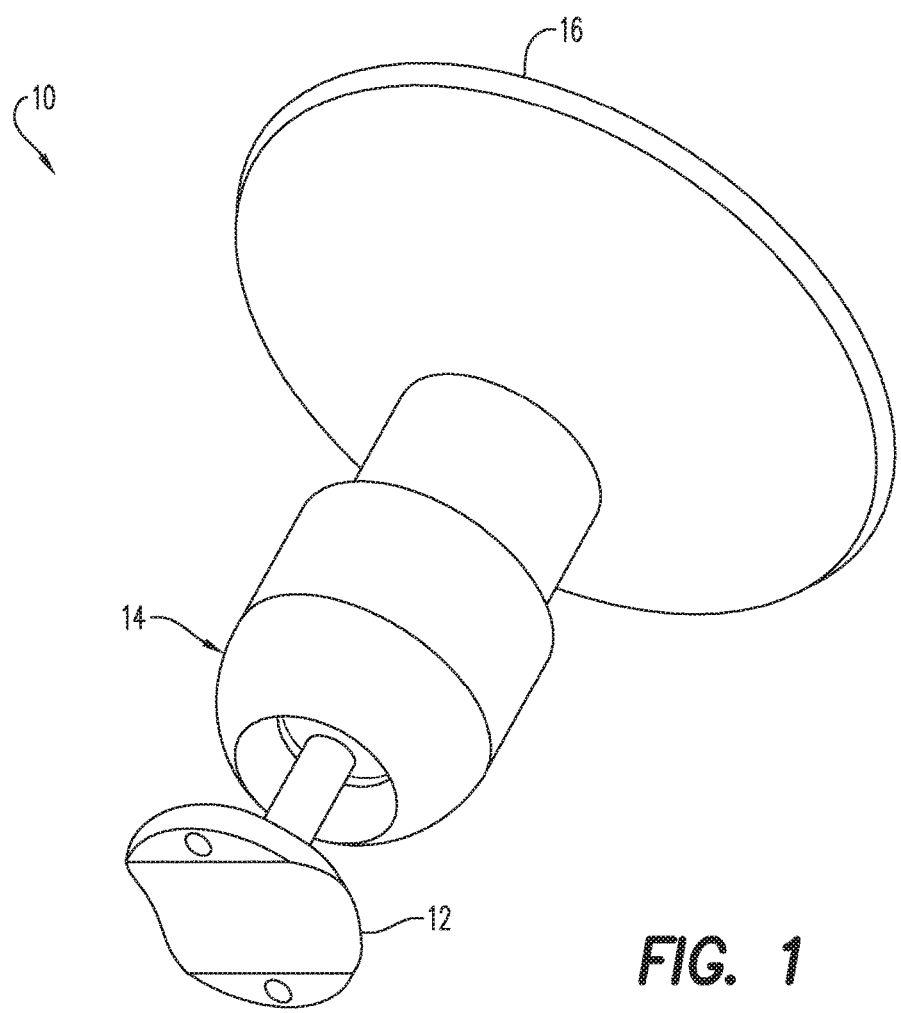
FIG. 1 is a rear perspective view of a ball joint mount according to a first embodiment of the present disclosure.

Referring to the drawings and in particular to FIGS. 1-6, exemplary embodiments of ball joint mounts are shown and are generally referred to by reference numeral 10. Mounts 10 each include a mounting member 12, a ball joint 14, and a mounted member 16.

Mounting member 12 is illustrated by way of example in the embodiments of FIGS. 1-2 and FIGS. 5-6 as a bracket, which can be secured to a structure such as, but not limited to, a pole, a building, a sign, a wall, a tree, and others. However, mounting member 12 is illustrated by way of example in the embodiment of FIGS. 3-4 as an extension device, which can be secured to any device in any desired manner.

Figure 3:
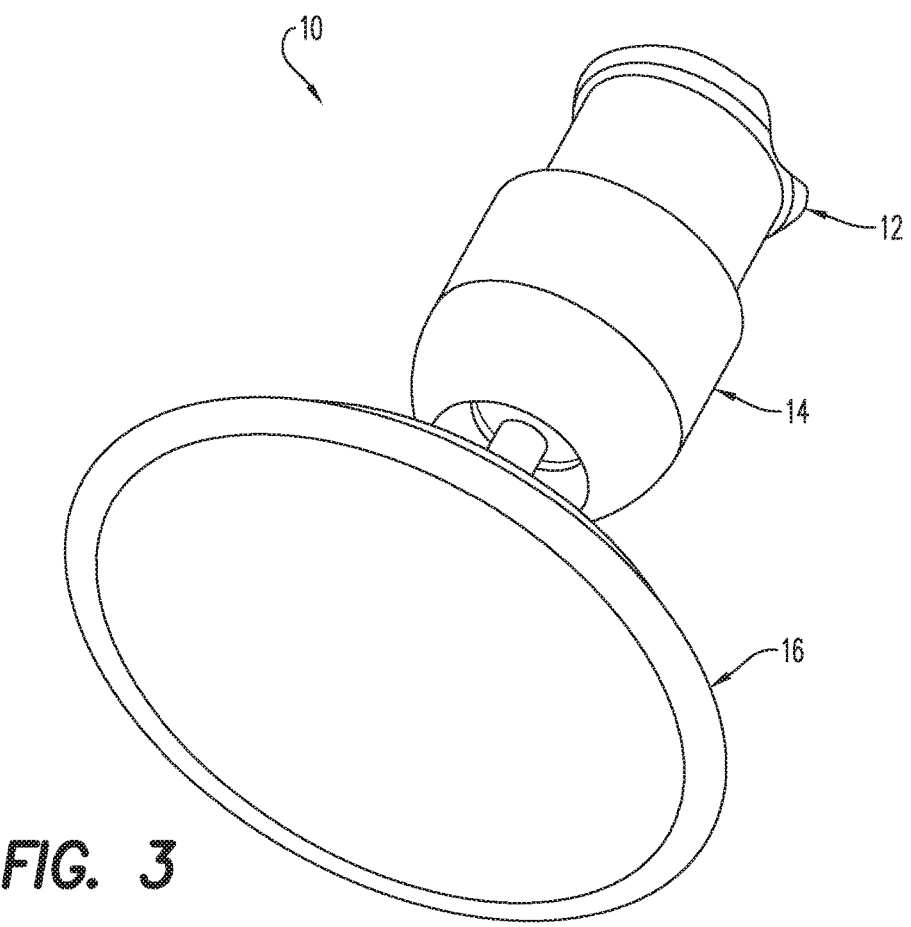
FIG. 3 is a front perspective view of a ball joint mount device according to a second embodiment of the present disclosure.
Figure 4:
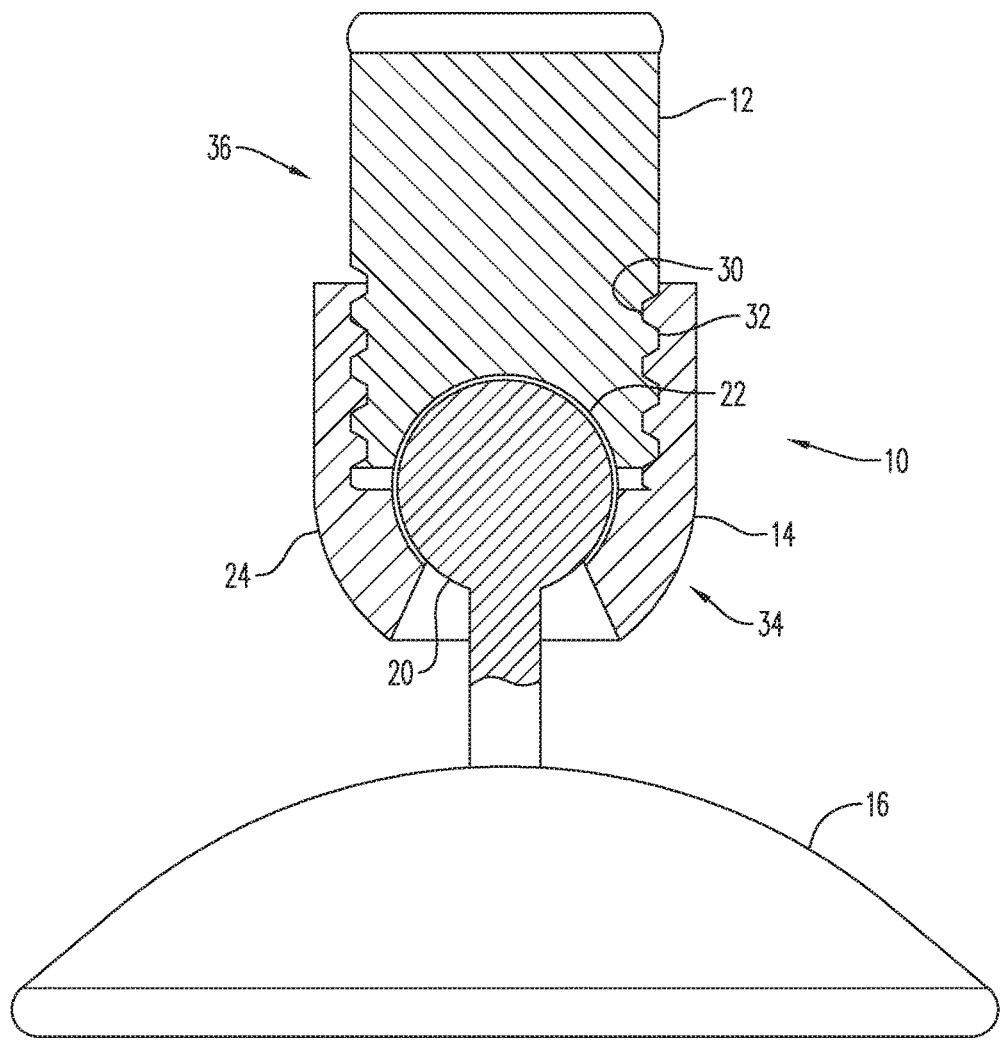
FIG. 4 is a partial sectional view of the ball joint mount of FIG. 3.
Figure 5:
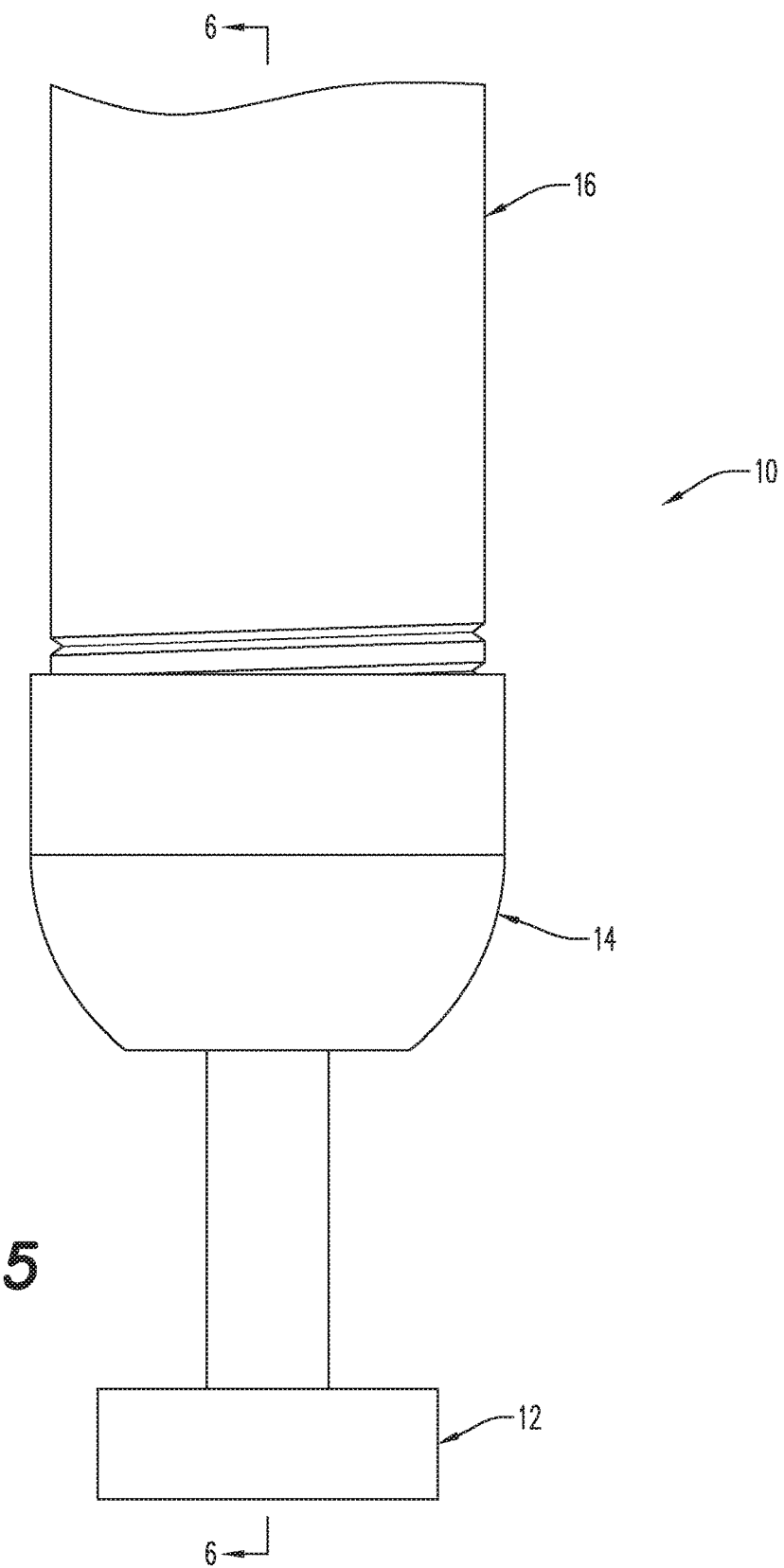
FIG. 5 is a side view of a ball joint mount device according to a third embodiment of the present disclosure.
Figure 6:
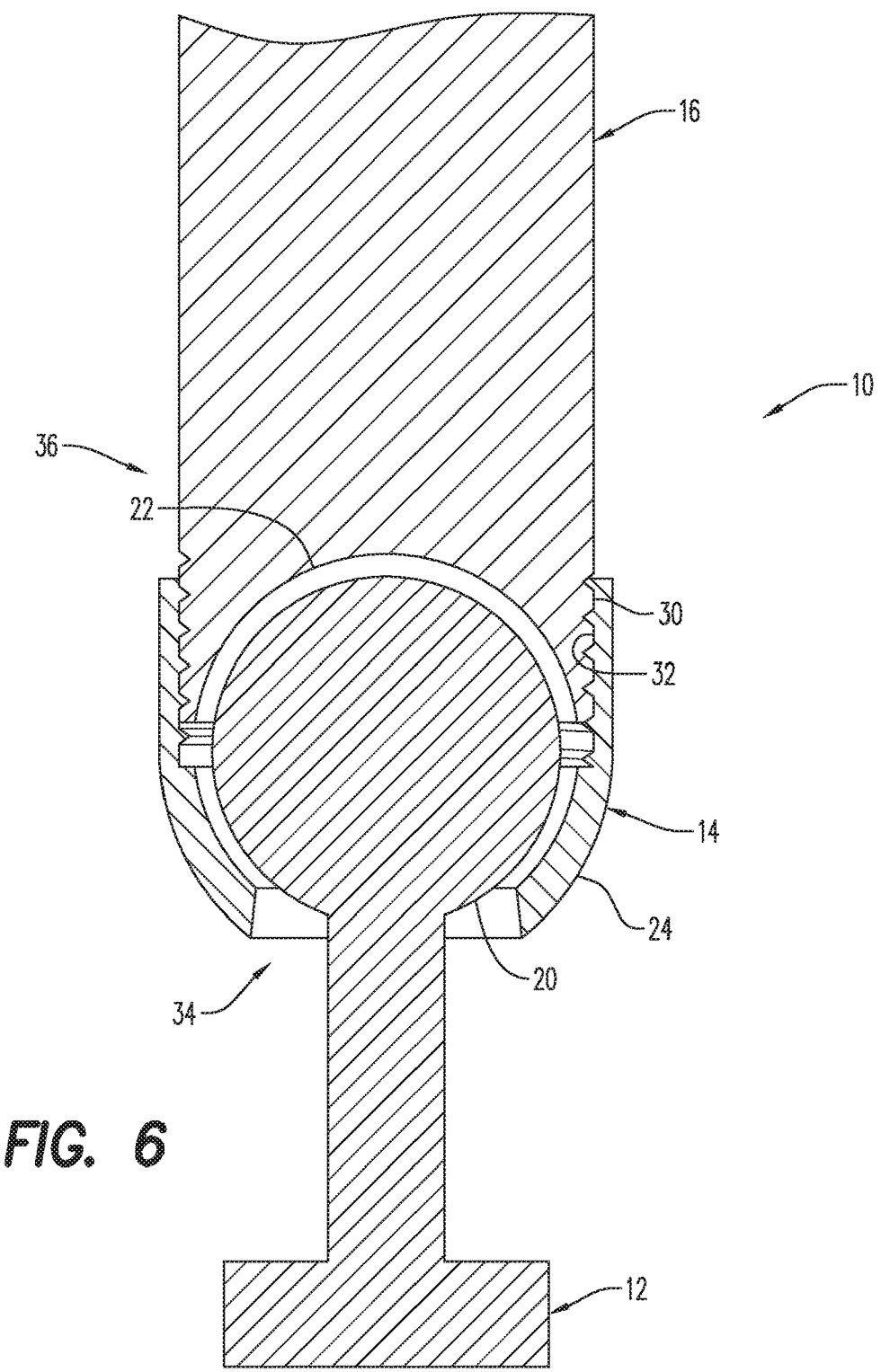
FIG. 6 is a partial sectional view of the ball joint mount of FIG. 5 taken along line 6-6.
Figure 7:
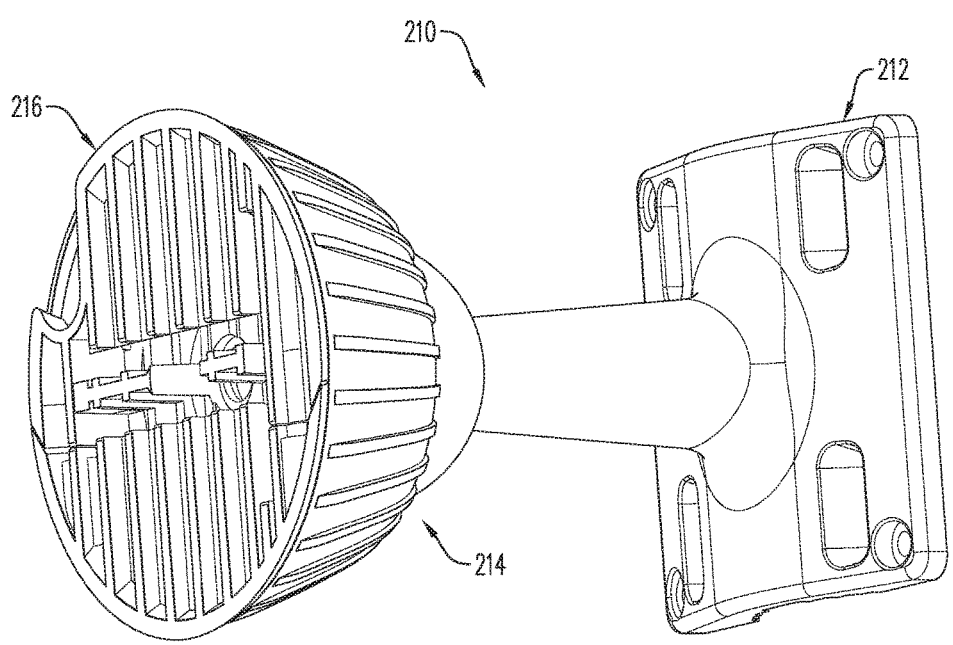
FIG. 7 is a front perspective view of a ball joint mount device according to another embodiment of the present disclosure.
Figure 8:
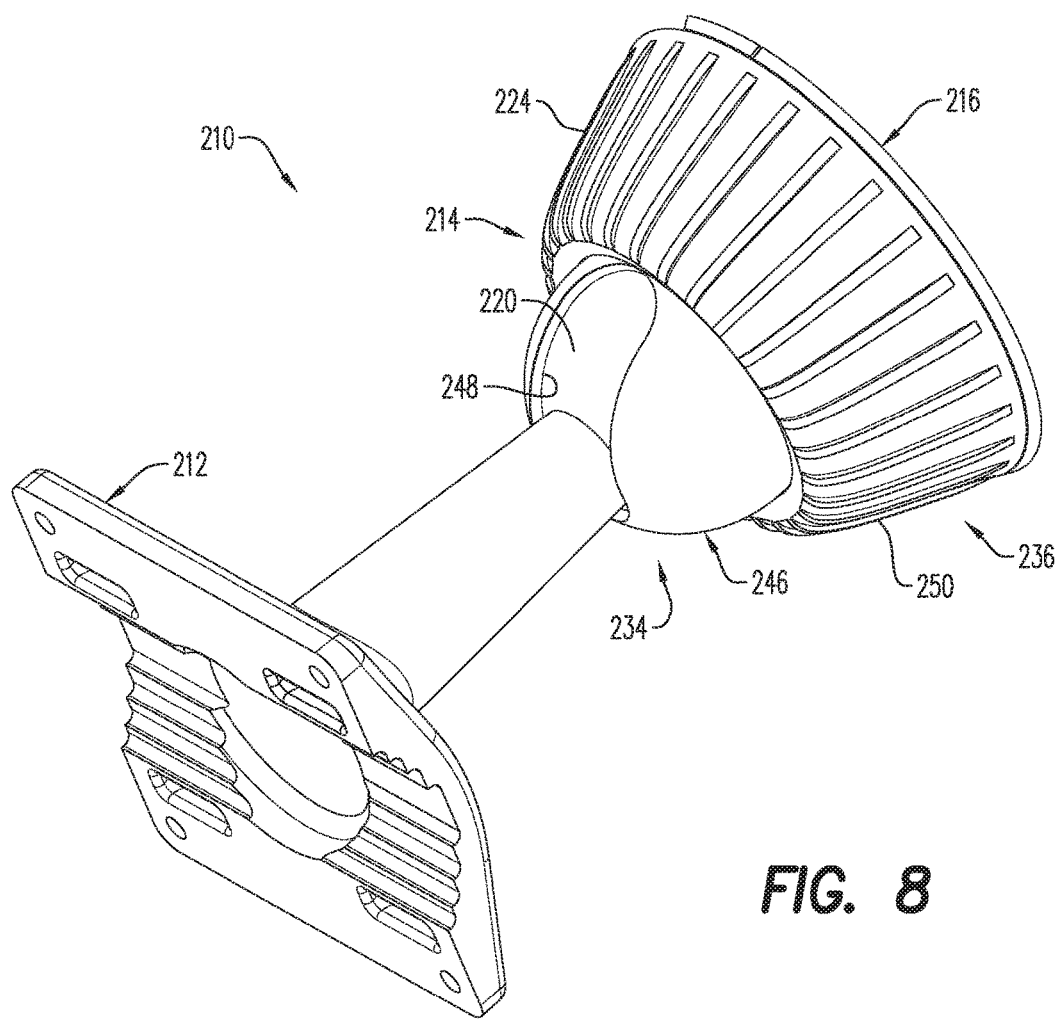
FIG. 8 is a rear perspective view of the ball joint mount of FIG. 7.
Figure 9:
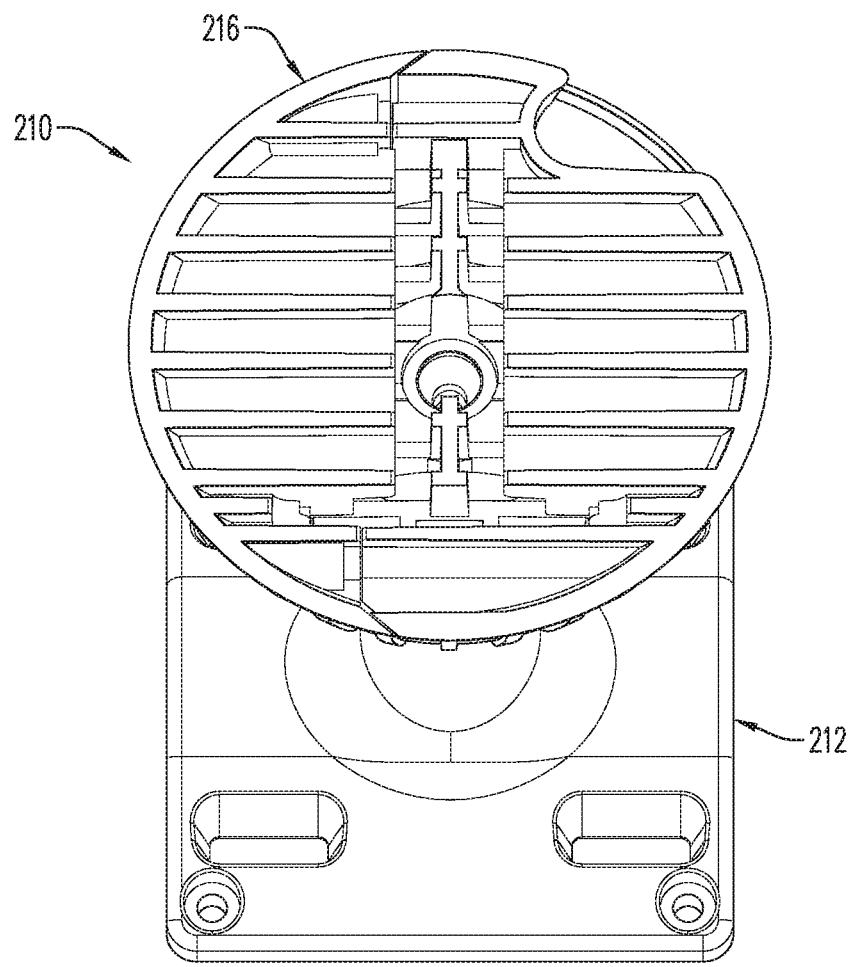
FIG. 9 is a front view of the ball joint mount of FIG. 7.
Figure 10:
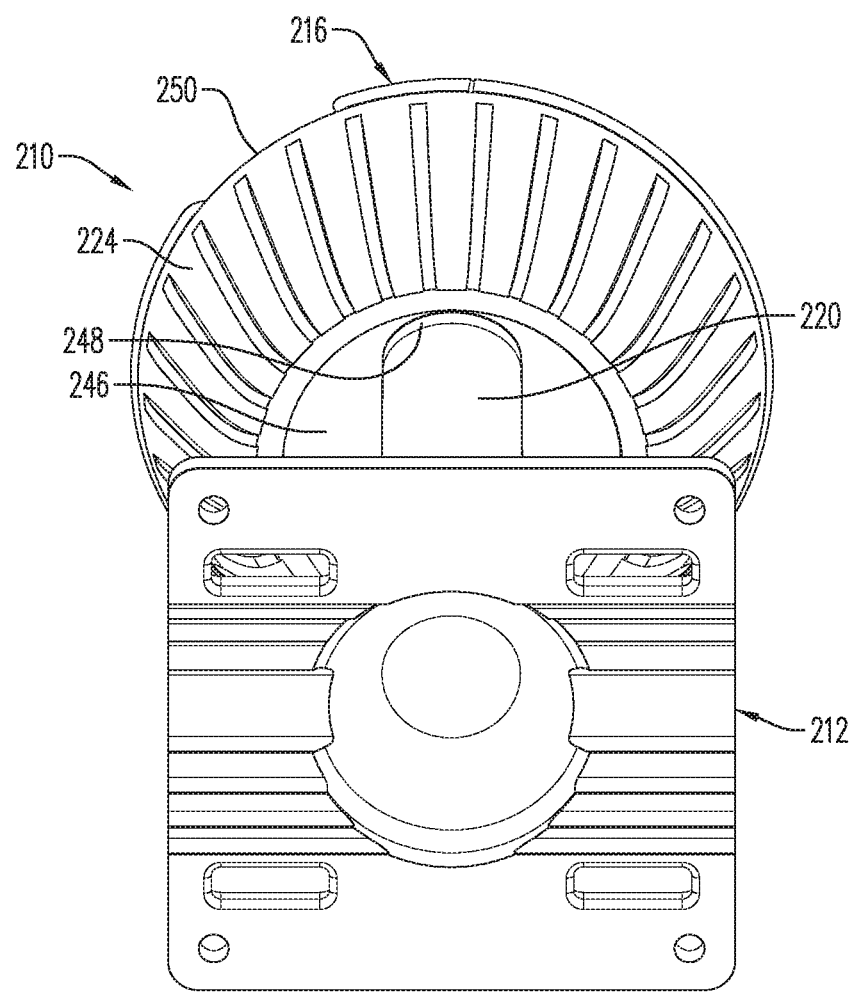
FIG. 10 is a rear view of the ball joint mount device of FIG. 7.
Figure 11:
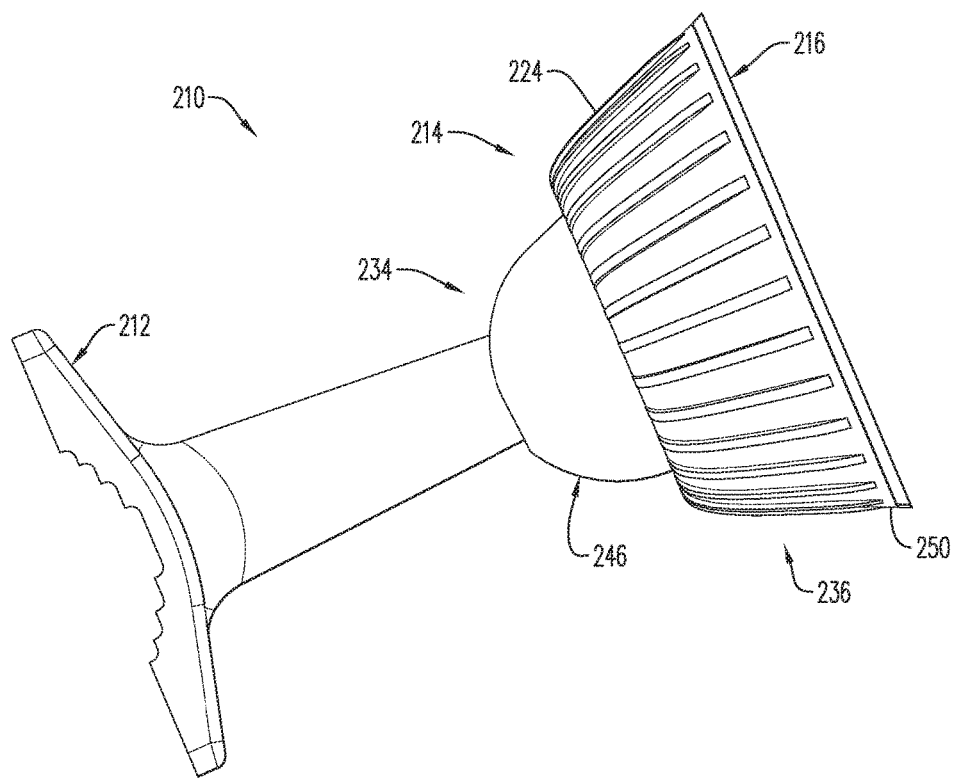
FIG. 11 is a first side view of the ball joint mount device of FIG. 7.
Figure 12:
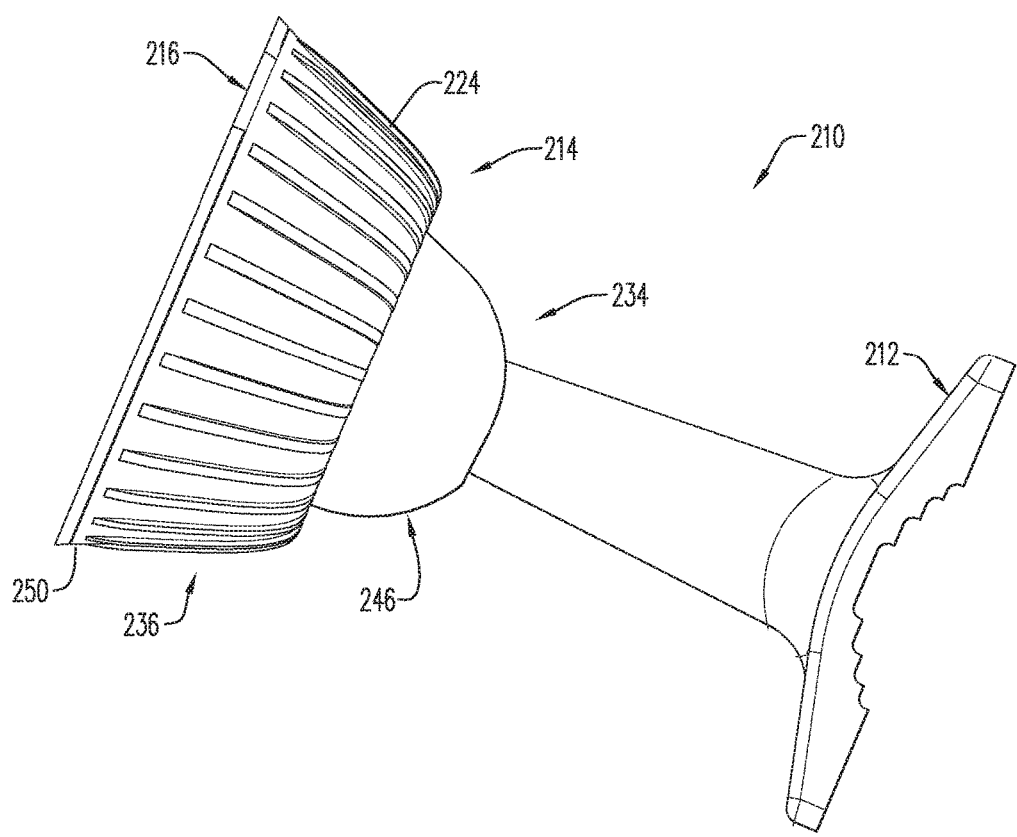
FIG. 12 is a second, opposite view of the ball joint mount device of FIG. 7.
Figure 13:
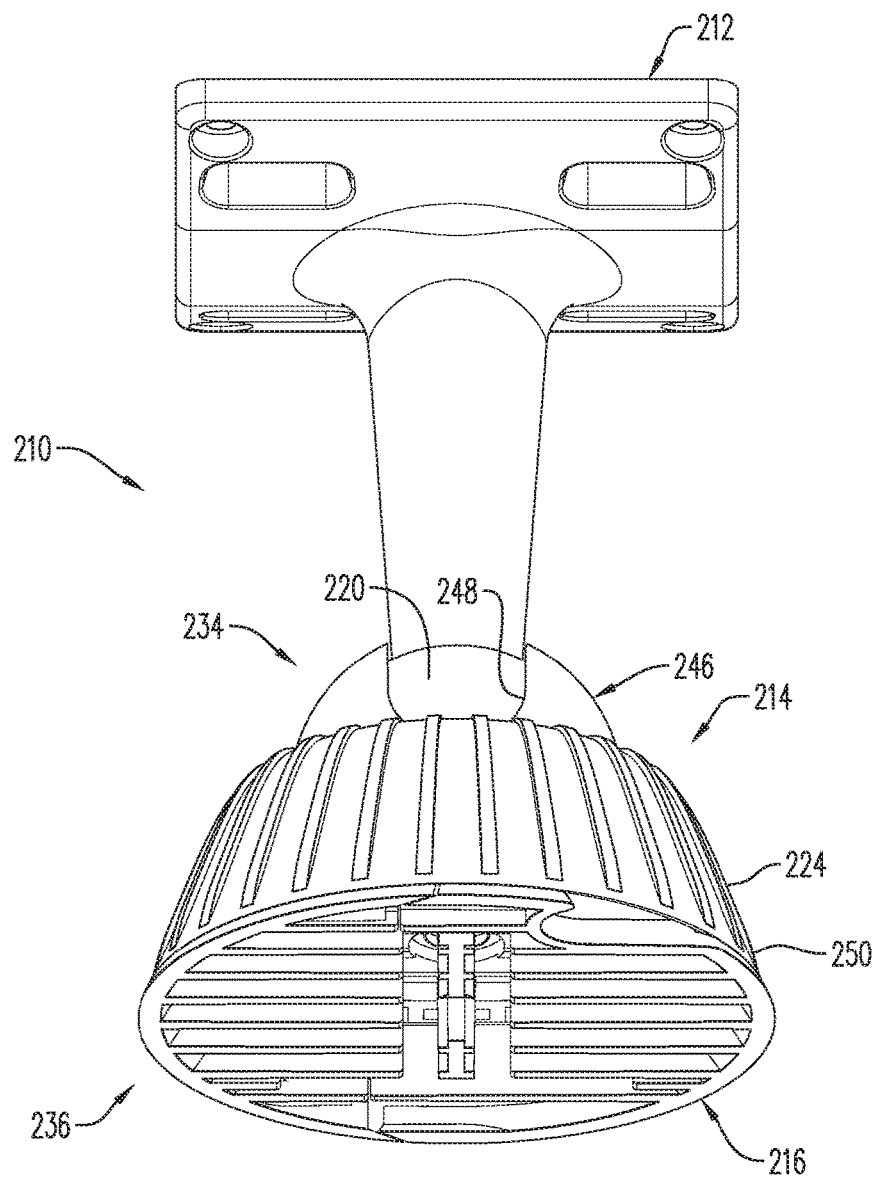
FIG. 13 is a top view of the ball joint mount device of FIG. 7.
Figure 14:
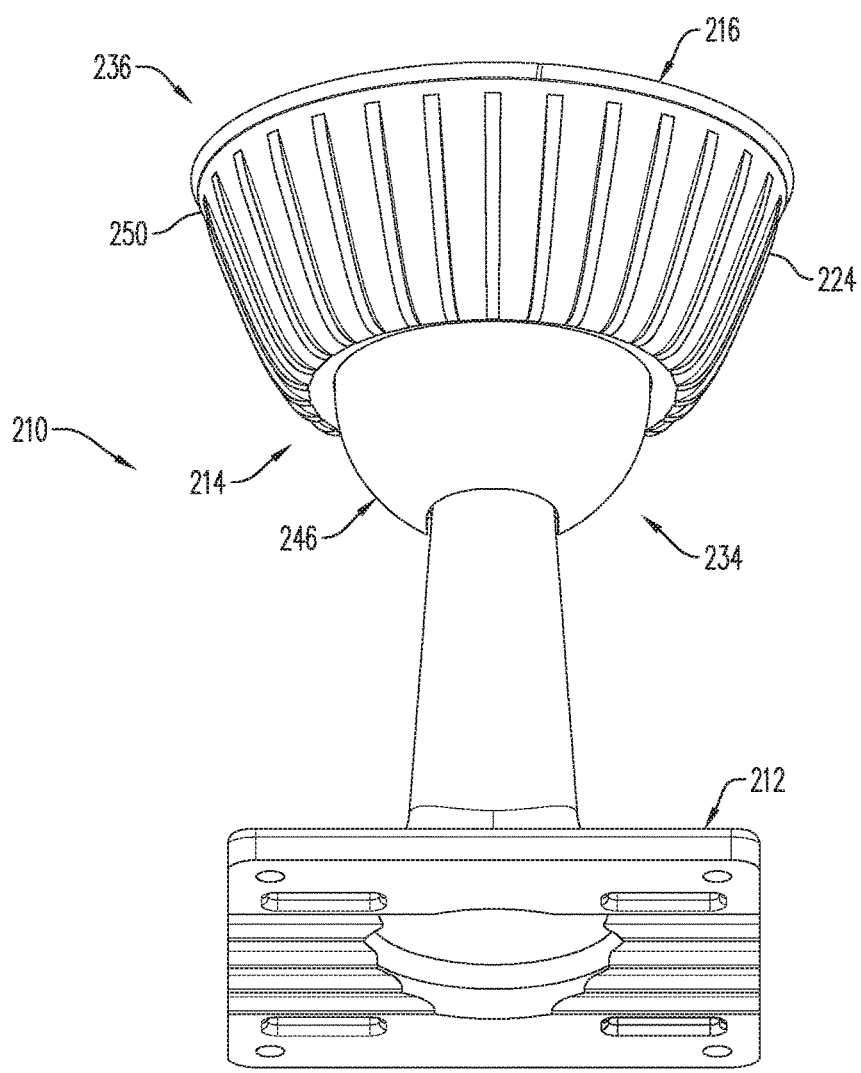
FIG. 14 is a rear perspective view of the ball joint mount device of FIG. 7.

Mounted member 16 is illustrated by way of example in the embodiments of FIGS. 1-2 and 3-4 as a dish shaped antenna, but is illustrated by way of example in the embodiment of FIGS. 5-6 as a cylindrical antenna. Of course, it is contemplated by the present disclosure for mounted member to include any (CPE) terminal, antenna or wireless device such as, but not limited to, any type of active, passive, or combined active-passive device.

In each embodiment, ball joint 14 includes a spherical member 20, a socket member 22, and a locking member 24.

In the embodiments of FIGS. 1-2 and FIGS. 5-6, ball joint 14 is configured so that spherical member 20 depends from mounting member 12 and socket member 22 depends from mounted member 16.

However in the embodiment of FIGS. 3-4, ball joint 14 is configured so that spherical member 20 depends from mounted member 16 and socket member 22 depends from mounting member 12.

Accordingly, it should be recognized that mount 10 can be configured having ball joint 14 in any desired orientation with respect to the mounting and mounted members 12, 16, respectively.

Socket member 22 has a first thread 30, while locking member 24 has a second thread 32. First and second threads 30, 32 are configured to threadably engage one another so as to secure the spherical member 20 between socket and locking members 22, 24. In this position, ball joint 14 prevents relative movement between mounting and mounted members 12, 16.

In the illustrated embodiments of FIGS. 1-6, first thread 30 is shown as a male thread and second thread 32 is shown as a female thread. Of course, it should be recognized that the present disclosure is not so limited. Rather, it is contemplated by the present disclosure for first thread 30 to be a female thread and second thread 32 to be a male thread.

Additionally and in the illustrated embodiments of FIGS. 1-6, first thread 30 is shown as an internally facing thread (i.e., facing towards a central axis of ball joint 14), while second thread 32 is shown as an externally facing thread (i.e., facing away from the central axis of ball joint 14). Of course, it should be recognized that the present disclosure is not so limited. Rather, it is contemplated by the present disclosure for first thread 30 to be externally facing and for second thread 32 to be internally facing.

Figure 2:
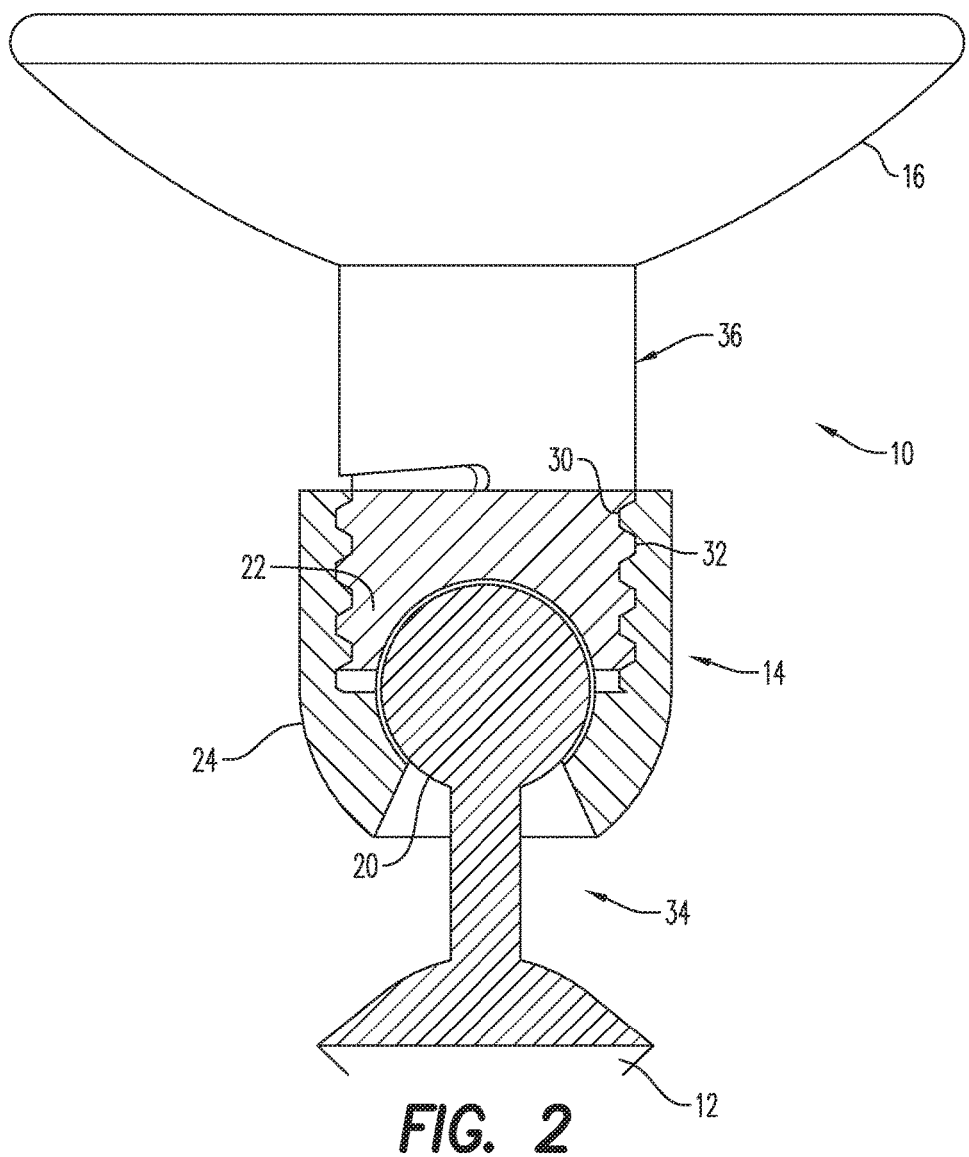
FIG. 2 is a partial sectional view of the ball joint mount of FIG. 1

Turning now to simultaneous reference to FIGS. 2, 4, and 6, locking member 24 is received over and retained on spherical member 20 such that the combination of the spherical and locking members 20, 24 forms a first portion 34 of ball joint 14. Socket member 22 forms a second portion 36 of ball joint 14.

Regardless of the orientation of ball joint 14, the use of mount 10 includes essentially the same assembly steps. First, mounting member 12 is secured to the desired structure or location with one of the portions of ball joint 14 secured thereto. Then, mounted member 16 is secured to mounting member 12 by threadably connecting the remaining portion of ball joint 14. The threaded connection of the first and second portions 34, 36 of ball joint 14 can be loosely formed at first—which connects the mounting and mounted members 12, 16 to one another but allows adjustment of the position of the mounted member 16 in three axes. Once mounted member 16 is in the desired position about the three axes, locking member 24 can be tightened to lock ball joint 14 in the desired position.

Advantageously, first portion 34 of ball joint 14, regardless whether it is present on mounting member 12 as in the embodiments of FIGS. 1-2 and FIGS. 5-6 or present on the mounted member 16 as in the embodiment of FIGS. 3-4, is preassembled and includes both spherical and locking members 20, 24 as a unitary subassembly. Accordingly, ball joint 14 permits one operator to easily assemble, adjust, and lock mounted member 16 in the desired position with respect to mounting member 12.

As can be seen in the embodiments of FIGS. 2, 4, and 6, locking member 24 enshrouds socket member 22. Without wishing to be bound by any particular theory, the easy of assembly of ball joint 14 is, at least partially, provided by the locking member 24 enshrouding socket member 22. As used herein, the term "enshrouding" shall mean that locking member 24 has a larger inner diameter than the outer diameter of at least the threaded portion of socket member 22.

Another exemplary embodiment of a ball joint mount according to the present disclosure is described below.

The mount includes a mounting member, a ball joint, and a mounted member.

The mounting member is a bracket, while the mounted member is illustrated as a second bracket that can be secured to any desired (CPE) terminal, antenna or wireless device such as, but not limited to, any type of active, passive, or combined active-passive device.

The ball joint includes a spherical member, a socket member, and a locking member. Similar to the embodiments of FIGS. 3-4 and FIGS. 5-6 discussed above, the ball joint is configured so that spherical member depends from the mounting member and the socket member depends from the mounted member. Of course, it should be recognized that the mount can be configured having ball joint in any desired orientation with respect to the mounting and mounted members, respectively.

The spherical member is secured to the mounting member by a bolt and a nut. Preferably, the locking member is secured between the mounting and spherical members so as to be rotatable for threaded connection with socket member in the manner described in more detail below.

In some embodiments, the ball joint includes a cover, which covers a head of the bolt. The cover can be formed of a rigid material or of an elastomeric material. When formed of an elastomeric material, the cover can protrude from an outer surface of the spherical member so that it is compressed by the threaded connection of the ball joint and can provide an increased coefficient of friction between the spherical and socket members.

In some embodiments, the ball joint includes a bearing positioned between the spherical and locking members. The bearing can assist rotation of the locking member with respect to the spherical member during the tightening of the locking member. The bearing can include one or more slots defined therein, which generally extend parallel to the central axis of the ball joint. When the ball joint is in use, the slots allow the bearing to compress or deform under the action of the spherical, socket, and the locking members—which can assist in distributing the compressive forces across a greater surface area of the spherical and socket members. Preferably, the bearing is formed of a material having sufficient resiliency to return to a normal, undeformed state when the ball joint is loosened.

Without wishing to be bound by any particular theory, the bearing is believed to provide enhanced fine tune adjustment when the locking member is partially tightened. For example, it has been determined that proper directional adjustment of the mounted member requires smooth movement of the ball joint in a region of between where the ball joint is completely fixed in one location and where it is completely loose with the mounted member not remaining in a particular location. It has been determined by the present disclosure that the addition of the bearing to the ball joint enhances or increases the smooth movement in this state of partially secured. Simply stated, it is believed that the bearing allows fine positional movement of the spherical and socket members with respect to one another when the locking member has been partially tightened.

The socket member has a first thread, while the locking member has a second thread. The first and second threads are configured to threadably engage one another so as to secure the spherical member between the socket and locking members. In this position, the ball joint prevents relative movement between the mounting and mounted members.

The first thread is an internally facing female thread and the second thread is an externally facing male thread.

The locking member includes an outer rim and an internal rim and the socket member similarly includes an outer rim and an inner rim.

The outer rim of the locking member enshrouds the socket member—namely forms the portion of the locking member that has a larger inner diameter than the outer diameter of at least the outer rim of the socket member. The inner rim of the locking member includes the externally facing male second thread thereon.

The outer rim of the socket member includes the internally facing female first thread thereon. The inner rim of the socket member forms a part of the wall of the socket in which the spherical member is received.

Of course, it is contemplated by the present disclosure for the first thread to be a female thread and/or internally facing, and the second thread to be a male thread and/or externally facing.

The locking member is received over and retained on the spherical member such that the combination of the spherical and locking members forms a first portion of the ball joint. When present, the cover and the bearing are similarly part of the first portion of the ball joint. The socket member forms a second portion of the ball joint.

Again, the use of the mount includes essentially the same assembly steps as those discussed above. First, the mounting member is secured to the desired structure or location with one of the portions of the ball joint secured thereto. Then, the mounted member is secured to the mounting member by threadably connecting the remaining portion of the ball joint.

Advantageously, the first portion of the ball joint, regardless whether it is present on the mounting member or present on the mounted member is preassembled and includes both the spherical and locking members as a unitary subassembly. Accordingly, the ball joint permits one operator to easily assemble, adjust, and lock the mounted member in the desired position with respect to the mounting member. The threaded connection of the first and second portions of the ball joint can be loosely formed at first—which connects the mounting and mounted members to one another but allows adjustment of the position of the mounted member in three axes. Once the mounted member is in the desired position about the three axes, the locking member can be tightened to lock the ball joint in the desired position.

Referring to FIGS. 7-14, another exemplary embodiment of a ball joint mount according to the present disclosure is shown. Here, component parts performing similar or analogous functions are labeled in multiples of two hundred to those in the embodiment of FIGS. 1-6.

Mount 210 includes a mounting member 212, a ball joint 214, and a mounted member 216. Mounting member 212 is again illustrated as a bracket, while mounted member 216 is illustrated as second bracket that can be secured to any desired (CPE) terminal, antenna or wireless device such as, but not limited to, any type of active, passive, or combined active-passive device.

Ball joint 214 again includes a spherical member 220, a socket member, and a locking member 224. Similar to the embodiments of FIGS. 3-4 and FIGS. 5-6 discussed above, ball joint 214 is configured so that spherical member 220 depends from mounting member 212 and the socket member depends from mounted member 216.

Spherical member 220 is formed in multiple parts that are secured to mounting member 212 by a bolt 240. Preferably, locking member 224 is secured between mounting and spherical members 212, 220 so as to be rotatable for threaded connection with the socket member in the manner described in more detail below.

In some embodiments, ball joint 214 includes a bearing 246 positioned between spherical and locking members 220, 224. Bearing 246 can assist rotation of locking member 224 with respect to spherical member 220 during the tightening of the locking member. Bearing 246 can include one or more slots 248 defined therein, which generally extend parallel to the central axis of the ball joint. When ball joint 214 is in use, slots 248 allow bearing 246 to compress or deform under the action of the spherical member 220, the socket member, and locking member 224—which can assist in distributing the compressive forces across a greater surface area of the spherical and socket members. Preferably, bearing 246 is formed of a material having sufficient resiliency to return to a normal, undeformed state when ball joint 214 is loosened.

Without wishing to be bound by any particular theory, bearing 246 is believed to provide enhanced fine tune adjustment when locking member 224 is partially tightened. For example, it has been determined that proper directional adjustment of mounted member 216 requires smooth movement of ball joint 214 in a region of between where the ball joint is completely fixed in one location and where it is completely loose with the mounted member not remaining in a particular location. It has been determined by the present disclosure that the addition of bearing 246 to ball joint 216 enhances or increases the smooth movement in this state of partially secured. Simply stated, it is believed that bearing 246 allows fine positional movement of the spherical member 220 and the socket member with respect to one another when locking member 224 has been partially tightened As discussed in detail above, bearing 246 can assist rotation of locking member 224 with respect to spherical member 220 during the tightening of the locking member and allows for smooth movement of ball joint 214 in a region of between where the ball joint is completely fixed in one location and where it is completely loose with the mounted member not remaining in a particular location.

The socket member has a first thread, while locking member 224 has a second thread. The first and second threads are configured to threadably engage one another so as to secure the spherical member 220 between the socket member and the locking member 224. In this position, ball joint 214 prevents relative movement between mounting and mounted members 212, 216.

Ball joint 214 has a cover positioned in the socket member. The cover can be formed of an elastomeric material that protrudes from an inner surface of the socket member so that it is compressed by the threaded connection of ball joint 214 and can provide an increased coefficient of friction between the spherical member 220 and the socket member.

While not shown, it is also contemplated by the present disclosure for ball joint 214 to have covers or elastomeric members on both the spherical member 220 and the socket member to increase the friction therebetween.

In this embodiment, first the thread is shown as an externally facing male thread and the second thread is shown as an internally facing female thread.

More specifically, locking member 224 includes an outer rim 250 and an internal rim and the socket member similarly includes an outer rim and an inner rim.

Outer rim 250 of locking member 224 enshrouds the socket member—namely forms the portion of locking member 224 that has a larger inner diameter than the outer diameter of at least the outer rim of the socket member. The inner rim of locking member 224 includes the internally facing female second thread thereon.

The outer rim of the socket member includes the externally facing male first thread thereon. The inner rim of the socket member forms a part of the wall of the socket in which spherical member 220 is received.

Of course, it is contemplated by the present disclosure for the first thread to be a female thread and/or internally facing, and the second thread to be a male thread and/or externally facing.

Locking member 224 is received over and retained on spherical member 220 such that the combination of the spherical and locking members 220, 224 forms a first portion 234 of ball joint 214. When present, bearing 246 is similarly part of first portion 234 of ball joint 214. The socket member and the cover, when present, form a second portion 236 of ball joint 214.

Again, the use of mount 210 includes essentially the same assembly steps as those discussed above. First, mounting member 212 is secured to the desired structure or location with one of the portions of ball joint 214 secured thereto. Then, mounted member 216 is secured to mounting member 212 by threadably connecting the remaining portion of ball joint 214.

Advantageously, first portion 234 of ball joint 214, regardless whether it is present on mounting member 212 or present on the mounted member 216 is preassembled and includes both spherical and locking members 220, 224 as a unitary subassembly. Accordingly, ball joint 214 permits one operator to easily assemble, adjust, and lock mounted member 216 in the desired position with respect to mounting member 212. The threaded connection of the first and second portions 234, 236 of ball joint 214 can be loosely formed at first—which connects the mounting and mounted members 212, 216 to one another but allows adjustment of the position of the mounted member 216 in three axes. Once mounted member 216 is in the desired position about the three axes, locking member 224 can be tightened to lock ball joint 214 in the desired position.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An antenna ball joint mount comprising a rigid socket member mechanically coupled to a spherical member with a locking member;
a bearing positioned between the spherical member and the locking member,
wherein the bearing is formed of a resiliently deformable material; and
wherein the rigid socket member has a concave inner surface, and the concave inner surface is shaped to receive at least a portion of the spherical member; and
the rigid socket member and the spherical member are fully detachable to simplify the installation of an antenna; a user is able to set a position of the antenna to any point on a spherical sector surface within a range of motion allowed by a shape of joint components and rotate the antenna around its own axis to adjust a polarization plane, and
wherein the rigid socket member and the locking member are configured to threadably engage one another so as to lock the antenna ball joint mount in a predetermined position.

2. The antenna ball joint mount of claim 1, wherein the spherical member has an outer surface, and
the concave inner surface of the rigid socket member is adjacent to the outer surface of the spherical member.

3. A ball joint mount comprising:
a ball joint having a spherical member, a socket member, a bearing and a locking member,
wherein the spherical member, bearing and the locking member form a first portion of the ball joint and the socket member forming a second portion of the ball joint;
wherein the socket member is a unitary member and has at least a portion complementarily shaped to receive the spherical member;
wherein the bearing is positioned between the spherical member and the locking member; and the bearing includes one or more slots that extend parallel to a central axis of the ball joint;
a mounting member; and
a mounted member,
wherein one of the first and second portions of the ball joint depend from the mounting member and the other of the first and second portions of the ball joint depend from the mounted member, and
wherein the socket member has a first thread and the locking member has a second thread, the first and second are configured to threadably engage one another so as to secure the spherical member between the socket member and the locking members to prevent relative movement between mounting and mounted members.

4. The ball joint mount of claim 3, wherein the mounting member is a bracket.

5. The ball joint mount of claim 3, wherein the mounted member is an antenna.

6. The ball joint mount of claim 3, wherein the first thread is a male thread and the second thread is a female thread.

7. The ball joint mount of claim 6, wherein the first thread is an externally facing thread and the second thread is an internally facing thread.

8. The ball joint mount of claim 3, wherein the first thread is a female thread and the second thread is a male thread.

9. The ball joint mount of claim 8, wherein the first thread is an internally facing thread and the second thread is an externally facing thread.

10. The ball joint mount of claim 3, wherein the locking member enshrouds the socket member.

11. The ball joint mount of claim 3, wherein the locking member has a larger inner diameter than an outer diameter of at least a portion of the socket member having the second thread.

12. The ball joint mount of claim 3, further comprising a cover formed of an elastomeric material.

13. The ball joint mount of claim 12, wherein the cover is connected to at least one of the socket member and the spherical member.

14. The ball joint mount of claim 3, wherein the first thread is an internally facing female thread and the second thread is an externally facing male thread.

15. The ball joint mount of claim 14, wherein the locking member includes an outer rim and an internal rim and the socket member includes an outer rim and an inner rim.

16. The ball joint mount of claim 15, wherein the outer rim of the locking member has a larger inner diameter than an outer diameter of at least the outer rim of the socket member.

17. The ball joint mount of claim 15, wherein the inner rim of the locking member includes the externally facing male second thread thereon and the outer rim of the socket member includes the internally facing female first thread thereon.

18. The ball joint mount of claim 3, wherein the first thread is an externally facing male thread and the second thread is an internally facing female thread.

19. The ball joint mount of claim 18, wherein the locking member includes an outer rim and an internal rim and the socket member includes an outer rim and an inner rim.

20. The ball joint mount of claim 19, wherein the outer rim of the locking member has a larger inner diameter than an outer diameter of at least the outer rim of the socket member.

21. The ball joint mount of claim 19, wherein the inner rim of the locking member includes the internally facing female second thread thereon and the outer rim of the socket member includes the externally facing male first thread thereon.

* * * * *